United States Patent
Bradley (10) Patent No.: US 8,528,013 B2
(45) Date of Patent: Sep. 3, 2013

(54) METHOD AND APPARATUS FOR LIMITING ACCESS TO PROGRAMMING IN A SWITCHED DIGITAL VIDEO SYSTEM

(75) Inventor: Bruce Bradley, Wayne, PA (US)

(73) Assignee: General Instrument Corporation, Horsham, PA (US)

( * ) Notice: Subject to any disclaimer, the term of this patent is extended or adjusted under 35 U.S.C. 154(b) by 1128 days.

(21) Appl. No.: 11/943,301

(22) Filed: Nov. 20, 2007

(65) Prior Publication Data

US 2009/0133049 A1    May 21, 2009

(51) Int. Cl.
H04N 7/16    (2011.01)

(52) U.S. Cl.
USPC ...... 725/28; 725/27; 725/9; 725/38; 725/104; 725/116; 725/117; 725/121; 725/138; 725/146; 725/147

(58) Field of Classification Search
None
See application file for complete search history.

(56) References Cited

U.S. PATENT DOCUMENTS

| | | | |
|---|---|---|---|
| 5,826,270 A | | 10/1998 | Rutkowski et al. |
| 5,969,748 A * | | 10/1999 | Casement et al. ............. 725/27 |
| 6,662,365 B1 | | 12/2003 | Sullivan et al. |
| 6,675,384 B1 * | | 1/2004 | Block et al. .................... 725/28 |
| 6,785,901 B1 | | 8/2004 | Horiwitz et al. |
| 6,922,843 B1 | | 7/2005 | Herrington et al. |
| 7,194,757 B1 * | | 3/2007 | Fish et al. ..................... 725/121 |
| 7,260,823 B2 | | 8/2007 | Schlack et al. |
| 2002/0023262 A1 * | | 2/2002 | Porter ............................ 725/25 |
| 2003/0046100 A1 * | | 3/2003 | Yamauchi ........................ 705/1 |
| 2003/0097563 A1 | | 5/2003 | Moroney et al. |
| 2004/0187161 A1 * | | 9/2004 | Cao ............................... 725/110 |
| 2004/0221303 A1 * | | 11/2004 | Sie et al. ......................... 725/29 |
| 2005/0028191 A1 * | | 2/2005 | Sullivan et al. ................. 725/28 |
| 2005/0155052 A1 * | | 7/2005 | Ostrowska et al. ............. 725/25 |
| 2005/0157217 A1 | | 7/2005 | Hendricks |
| 2005/0289623 A1 | | 12/2005 | Midani et al. |
| 2006/0095940 A1 | | 5/2006 | Yearwood |
| 2006/0242683 A1 | | 10/2006 | Medford et al. |
| 2007/0107024 A1 * | | 5/2007 | Versteeg et al. ................. 725/95 |
| 2007/0130596 A1 | | 6/2007 | Wirick |
| 2007/0186231 A1 * | | 8/2007 | Haeuser et al. ................. 725/25 |
| 2009/0165072 A1 | | 6/2009 | Wright-Riley |

FOREIGN PATENT DOCUMENTS

EP    0756797    10/2001

OTHER PUBLICATIONS

PCT International Search Report, Re: PCT Application #PCT/US08/83216 Nov. 12, 2008.
Canadian Office Action for Canadian Patent Application No. 2,685,233, dated Aug. 7, 2012.
PC Magazine Staff, "FCC's Martin Supports 'A La Carte' Cable Plans", PCMAG.com article, dated Aug. 22, 2007.
Solis, Hilda L., "TV a la carte? I'll take the Buffet", San Francisco Chronicle, CommonDreams News Center, dated May 15, 2007.

* cited by examiner

Primary Examiner — Jason J Chung
(74) Attorney, Agent, or Firm — Lori Anne D. Swanson (57) ABSTRACT

A content delivery system headend is provided. The headend includes a Switched Digital Video (SDV) manager for coordinating SDV sessions requested by subscribers over an access network. The headend also includes an input unit such as a server for receiving content to be broadcast during the SDV sessions. Additionally, the headend includes a subscriber control unit for comparing channel change requests received by the SDV manager from subscribers to subscriber-established rules. Tuning information for accessing programming specified in the channel change requests is only supplied if the channel change requests do not conform to any of the subscriber-established rules for blocking the programming.

14 Claims, 7 Drawing Sheets

METHOD AND APPARATUS FOR LIMITING ACCESS TO PROGRAMMING IN A SWITCHED DIGITAL VIDEO SYSTEM

FIELD OF THE INVENTION

The present invention relates generally to content delivery systems that deliver broadcast channels and switched digital video (SDV) channels to subscribers and to parental controls for limiting access to content in such systems.

BACKGROUND OF THE INVENTION

The exposure of children to inappropriate material on television, such as sexual content, violence, coarse language, and so forth, has long been a concern. Recent technological developments now allow parents and other responsible individuals to control what children may see on television and to view a log of programming that has been previously viewed. For example, access to programming may be controlled by a user (e.g. a parent) based on certain program characteristics, such as program titles, ratings, times, or channels. In such systems, programming may be blocked and unblocked by entering a parental control code in a set top terminal through which the programming is received. This can be a cumbersome process, especially if the user desires to block channels on a room-by-room basis in residences where there are multiple televisions each with their own set top terminal. In this case each set top terminal needs to be separately programmed to prevent or limit access to certain program content.

Accordingly, it would be desirable to provide a simplified arrangement for limiting access to programming and for acquiring a log of previously viewed programming which is easy for the end user to configure, regardless of the number of set top terminals that may be present in the residence.

SUMMARY

In accordance with one aspect of the present invention, a content delivery system headend is provided. The headend includes a Switched Digital Video (SDV) manager for coordinating SDV sessions requested by subscribers over an access network. The headend also includes an input unit such as a server for receiving content to be broadcast during the SDV sessions. Additionally, the headend includes a subscriber control unit for comparing channel change requests received by the SDV manager from subscribers to subscriber-established rules. Tuning information for accessing programming specified in the channel change requests is only supplied if the channel change requests do not conform to any of the subscriber-established rules for blocking the programming.

In accordance with another aspect of the invention, a method is provided for accessing programming over an SDV system. The programming may be accessed by a subscriber terminal such as a set top terminal. At least one rule for blocking programming is provided to the SDV system. In response to user input, a channel change request is sent. The channel change request requests the SDV system to supply a selected program or channel. A control message is received in response to the channel change request. The control message includes tuning information for tuning to a program or channel different from the selected program or channel if the selected channel or program does not conform to the rule. The subscriber terminal tunes to the different program or channel as directed by the control message.

DETAILED DESCRIPTION

As detailed below, parental controls can be implemented in a relatively simple manner in Switched Digital Video (SDV) systems. SDV refers to an arrangement in which broadcast channels are only switched onto the network when they are requested by one or more subscribers, thereby allowing system operators to save bandwidth over their distribution network. In conventional cable or satellite broadcast systems, every broadcast channel is always available to all authorized subscribers. In contrast, a switched digital video channel is only available when requested by one or more authorized subscribers. Also, unlike video on-demand, which switches a singlecast interactive program to a user, switched digital video switches broadcast streams, making each stream available to one or more subscribers who simply join the broadcast stream just as they would with normal broadcast services. That is, once a switched service is streamed to a subscriber, subsequent subscribers associated with the same service group as the first subscriber can tune to the same broadcast stream. The switched digital video will often share the same resource managers and underlying resources with other on-demand services.

SDV systems can simplify implementation of parental controls because each time a user changes from one channel to another, a channel change request is sent from the user's subscriber device (e.g., a set top terminal) to a session manager in the network's headend. Channel change requests are one type of message that is communicated between the session manager and the subscriber using an SDV Channel Change Message (CCM) protocol, which can be implemented as a proprietary protocol or as an open standard. After a channel change request is passed from the subscriber to the session manager, the session manager would normally respond by sending a message that requests the subscriber device to tune to a channel on which the SDV channel will be made available. The message also includes the necessary tuning information for tuning to that SDV channel. In the present case such additional messages will direct the subscriber device to tune to an alternative channel, typically a channel that presents a message to the subscriber that the desired channel is being blocked. That is, the correct tuning information for the desired channel will be sent from the session manager to the subscriber device only if the channel change request conforms to pre-established rules (e.g., parental controls) that the user has made available to the session manager.

Figure 1:
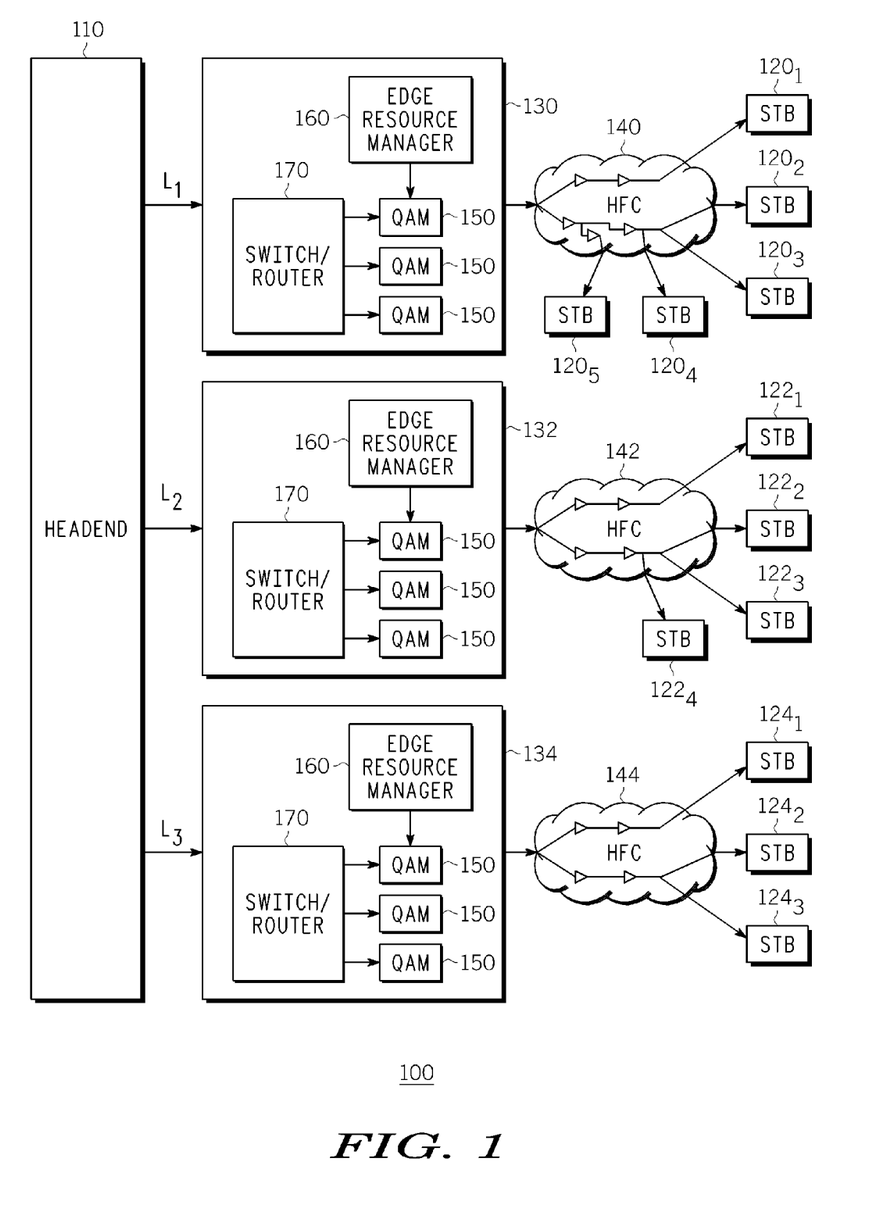
FIG. 1 shows one example of a content delivery system

FIG. 1 shows one example of a content delivery system architecture 100 for delivering both broadcast channels and switched digital channels to a subscriber during a switched digital video (SDV) session. The SDV session is implemented through a service offering in which application level data generated by a set-top terminal initiates a SDV session request and an SDV manager routes data in accordance with the request to provision the service. Among other components, system architecture 100 comprises a content distribution source such as a headend 110 that is connected to multiple intermediate entities such as hubs 130, 132 and 134. The headend 110 communicates with a switch or router 170 in hubs 130, 132 and 134 over links L1, L2 and L3, respectively. The headend 110 and hubs 130, 132, and 134 may communicate over a packet-switched network such as a cable data network, passive optical network (PON) or the like using, for example, IP multicast addressing.

Some or even all of the hubs are connected to multiple users, typically via distribution networks such as local cable access networks (e.g., HFC networks). For simplicity of explanation only, each hub is shown as being connected to a distinct HFC network, which in turn communicates with end user equipment as illustrated. In particular hubs 130, 132 and 134 in FIG. 1 communicate with access networks 140, 142 and 144, respectively. Each access network 140, 142 and 144 in turn communicates with multiple end user devices such as set top or subscriber terminals. In the example of FIG. 1, access network 140 communicates with set top terminals $120_1$, $120_2$, $120_3$, $120_4$ and $120_5$, access network 142 communicates with set top terminals $122_1$, $122_2$, $122_3$ and $124_4$, and access network 144 communicates with set top terminals $124_1$, $124_2$ and $124_3$.

In addition to the switch or router 170, each hub can include an array of radio frequency transmitter edge devices such as edge QAM modulators 150. The number of edge devices 150 in each hub may vary as needs dictate. For instance, as previously noted, the number of edge devices needed to implement SDV channels is generally much greater than the number of edge devices needed to implement broadcast channels. As used herein, the term "QAM" refers to modulation schemes used for sending signals over cable access networks. Such modulation schemes might use any constellation level (e.g. QAM-16, QAM-64, QAM-256 etc.) depending on the details of a cable access network. A QAM may also refer to a physical channel modulated according to such schemes. Typically, a single QAM modulator can output a multiplex of ten or twelve programs, although the actual number will be dictated by a number of factors, including the communication standard that is employed. The edge QAM modulators usually are adapted to: (i) receive Ethernet frames that encapsulate the transport packets, (ii) de-capsulate these frames and remove network jitter, and (iii) transmit radio frequency signals representative of the transport stream packets to end users, over the HFC network. Each transport stream is mapped to a downstream QAM channel. Each QAM channel has a carrier frequency that differs from the carrier frequency of the other channels. The transport streams are mapped according to a channel plan designed by the MSO that operates the network.

Each hub 130, 132 and 134 also includes an edge resource manager 160 for allocating and managing the resources of the edge devices 150. The edge resource manager 160 communicates with and receives instructions from the session manager located in the headend 110. In some cases the edge resource manager and/or session manager can be located in the headend.

Figure 2:
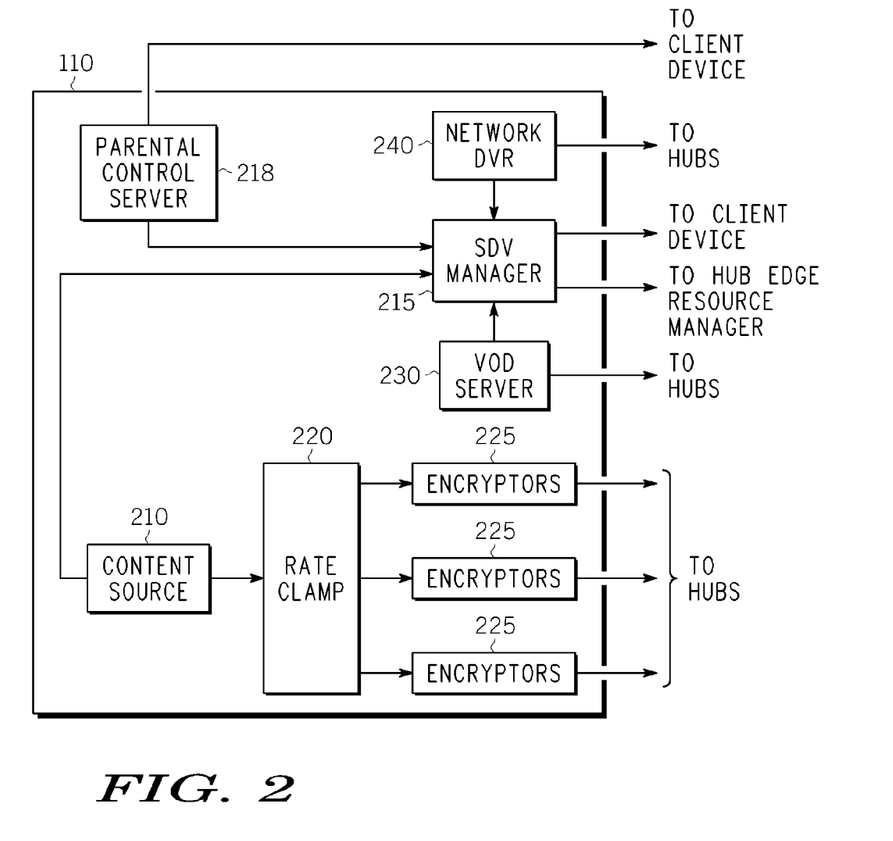
FIG. 2 shows one example of the headend depicted in FIG. 1.

FIG. 2 shows one example of headend 110. The headend 110 includes a broadcast content source 210, which may include, by way of example, satellite receivers, off-air receivers and/or content storage devices such as servers. A SDV manager 215 is used to determine which SDV transport streams are being transmitted at any time and for directing the set top terminals to the appropriate stream. The SDV manager 215 also keeps track of which subscribers are watching which channels and it communicates with the edge resource managers 160 in the hubs so that the content can be switched on and off under the control of the SDV manager 215. In addition, all subscriber requests for a switched digital channel go through the SDV manager 215. The switched digital channels are forwarded to a rate clamp 220 and one or more encryptors 225 using, for example, IP multicast addressing. The content is then encrypted by the encryptors 225 and transmitted to the appropriate hub or hubs. Typically, standard definition (SD) channels are currently rate clamped to 3.75 Mbps while high definition channels are currently rate clamped to between about 12 Mbps and 15 Mbps. The encryptors 225 encrypt the digitally encoded content, often under the control of a conditional access system (not shown).

Headend 110 may also include a network DVR 240. The network DVR 240 stores content that can be transmitted to set top terminal via a hub and access network in response to a user request to play a program stored on the DVR 240. Other user input requests are also serviced by network DVR 240, including, for example, requests to accelerate the playing of a program in the forward direction (e.g., cueing) and in the reverse direction (e.g., reviewing). The content is stored by the network DVR 240 upon a user request. The content may be provided to the network DVR 240 from any available content source, including, for example, content source 210.

It should be noted that in some cases the functionality of some or all of the SDV manager 215 may be transferred to each of the hubs 130, 132 and 134. For example, as described below, Channel Change Messages may be communicated between the set top terminals and the hubs. In addition, some or all of the functionality of the SDV manager 215 may be distributed among other components such as an SDV operations manager (SDVOM), which is sometimes used to configure and monitor SDV systems.

Headend 110 may also include a variety of other components for offering additional services. For example, in FIG. 2 a video on demand (VOD) server 230 is shown for storing programs or other content for distribution to subscribers on an on-demand basis. Although not shown, one of ordinary skill in the art would recognize that other components and arrangements for achieving the various functionalities of headend 110 are possible. For example, the head-end 110 may comprise typical head-end components and services including a billing module, an advertising insertion module, a subscriber management system (SMS), a conditional access system and a LAN(s) for placing the various components in data communication with one another. Headend 110 also includes a parental control server 218, which will be discussed below. It will also be appreciated that the headend configuration depicted in FIG. 2 is a high-level, conceptual architecture and that each network may have multiple head-ends deployed using different architectures.

The edge devices 150 provide programming to the set top terminals using the downstream in-band channels. To communicate control information and the like with the headend 110 and/or the relevant hub, the set top terminals may use out-of-band (OOB) or DOCSIS channels or an IP tunnel or an IP connection and associated protocols. However, in some cases communication of control information and the like can be performed using in-band channels as well.

Control information that may be communicated over the out-of-band channels includes the aforementioned SDV channel change messages (CCM), which are used to pass channel change requests from the subscriber to the SDV manager 215 in the headend 110. In particular, the SDV manager 215 receives channel change requests for switched digital content from a set top terminal to bind that content to a session on one of edge devices 150 serving that set top terminal's service group. The channel change request message is generated by the SDV application (or its designated proxy) resident in the set top terminal in response to the subscriber's program channel request that is entered by the set top terminal's user interface. The SDV manager 215 responds to the set top terminal with the frequency and program number where that content may be found. The SDV manager 215 requests the set top terminal to tune to the channel corresponding to this frequency and program number using a so-called force tune function. The SDV manager 215 also receives channel change request messages for non-SDV (e.g., broadcast) channels in order to gather statistics that can be used to better understand subscriber activity and to provide information that can be used for targeted advertising and the like. Another reason to receive non-SDV channel changes is so that the SDV Manager knows when the set top terminals are no longer tuned to an SDV channel, thus allowing the SDV Manager to remove the SDV channel from the network to save bandwidth.

As previously mentioned, since the SDV manager 215 receives channel change requests for SVD and non-SDV channels, the SDV manager can be configured so that the necessary tuning information is only passed along to the subscriber in an in-band or out-of-band control message if the channel change request conforms to pre-established rules (e.g., parental controls) that the user has made available to the session manager. If the request does not conform to the pre-established rules, the control message from the SDV manager will direct the subscriber to tune to an alternative channel, typically a channel that presents a message to the subscriber that the desired channel is being blocked. In some cases it may be necessary to prevent the set top terminal from acquiring the tuning information for the blocked program or channel for an alternative source such as the active services list that is often transmitted using the min-carousel protocol (MCP). This can be accomplished by sending a control message to the set top terminal instructing it to only tune to channels provided through the SDV manager.

The pre-established rules may be communicated to the SDV manager 215 in any appropriate manner. For instance, in one example, the user may supply the rules via an Internet-enabled client device that accesses a user account database in a server associated with or in communication with the SDV manager 215, such as parental control unit or server 218 depicted in FIG. 2. The client device may be the user's own set top terminal or another device such as a personal computer, PDA, networked appliance, cellphone or the like. The user account database may be accessed through an application-level interface residing on the client device such as a web-browser.

Figure 3:
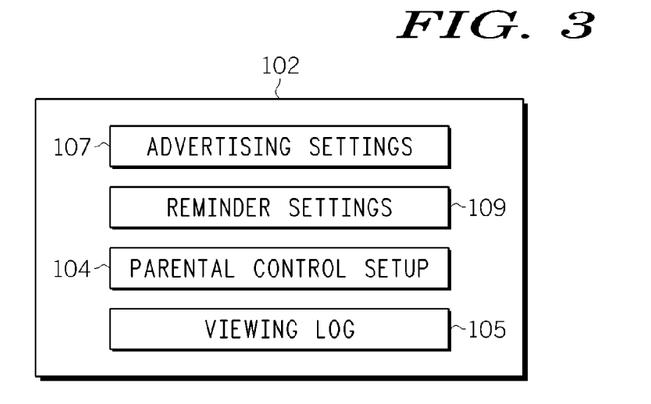
FIG. 3 shows one example of a setup menu that may be displayed to the user when contacting the headend.

FIG. 3 shows one example of a setup menu 102 that may be displayed to the user when contacting the headend 110. The menu presents various settings options such as an advertising setting 107, reminder setting 109, parental control setup menu 104 as well as a viewing log 105. The parental lock feature may be accessed by selecting the parental control setup menu 104 so that a parental control interface is displayed, examples of which are shown in FIGS. 5-9. In some cases an input dialog box will first appear requiring a password to be input prior to accessing the parental lock interface. In other cases a password may not be required until an attempt is made to alter the control settings. FIG. 3 also shows a viewing log option 105 that allows the subscriber to see a list of all the programming that has been viewed through the various set top terminals in the household over some selected period of time (e.g., the past week). Information in the log can be used, for example, to revise and refine the parental controls that are put in place by the subscriber.

Figure 4:
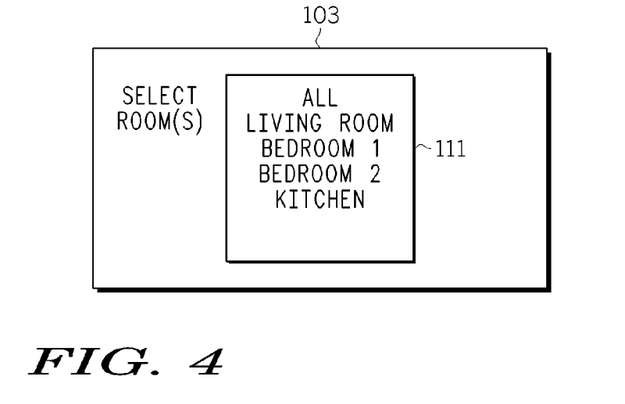
FIG. 4 shows a first parental control interface screen that may be presented to the user if the user has more than one set top terminal in his or residence.

The parental control interface screen 103 of FIG. 4 may be presented to the user if the user has more than one set top terminal in his or residence. This screen 103 provides the user with a pulldown menu 111 that presents the user with the option to establish a common set of controls for all the set top terminals or to establish different sets of controls on a room by room basis. Once the desired selection has been made, the channel lock interface screen 223 shown in FIG. 5 may be presented. The interface screen 223 presents a channel lock button 224, which is highlighted (or otherwise made visually distinguishable) in FIG. 5 to indicate that it is the selected screen. The interface screen 223 includes a field 230 of channel cells 232. In each channel cell there is a channel identifying field 234 and a channel number field 236. The channel identifying field contains channel identifying indicia such as one or more of the channel number, channel call letters, channel name, and the like. In other examples, the channel logo may be depicted in the channel identifying field, for example, as each channel cell's sole channel identifying indicium, or, in addition to one or more of channel number, channel call letters, channel name, and so forth.

Figure 5:
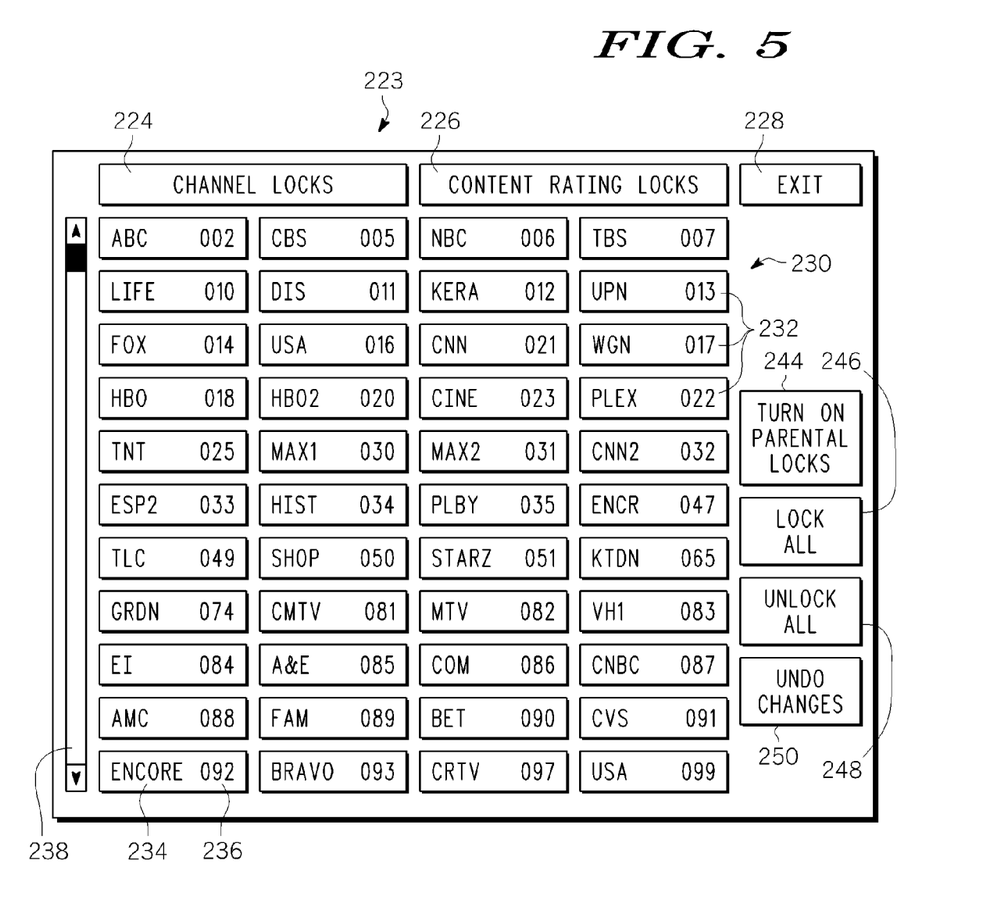
FIG. 5 shows a channel lock interface screen that may be presented to user after making a selection from the parental control setup option in FIG. 3 or a selection from the screen FIG. 4.

In the channel lock interface screen 223, a user may select particular channels to lock and unlock, for example, wherein clicking on a particular channel cell toggles that channel between a locked and unlocked state. The indicia within the cells of locked channels generally will be distinguishable from unlocked channels. In the event that the number of channels available is greater than the number of channel cells 232 that may be displayed within the interface screen 223, a scroll bar 238 may be provided to allow a user to bring additional channels into view in field 230. A button 244 is provided to turn on parental locks after a user's selections have been made using the channels cells 232. A lock all button 246 may be provided for locking all channels as well as an unlock all button 248 for removing all locks. A user's previous settings may be saved in memory and an undo button 250 may be provided that allows a user to discard any changes made and to reinstate earlier settings. If a password was not required to access the parental lock interface itself, a dialog box requiring entry of a password may be provided when the user selects one of buttons 244, 246, 248 or 250.

Figure 6:
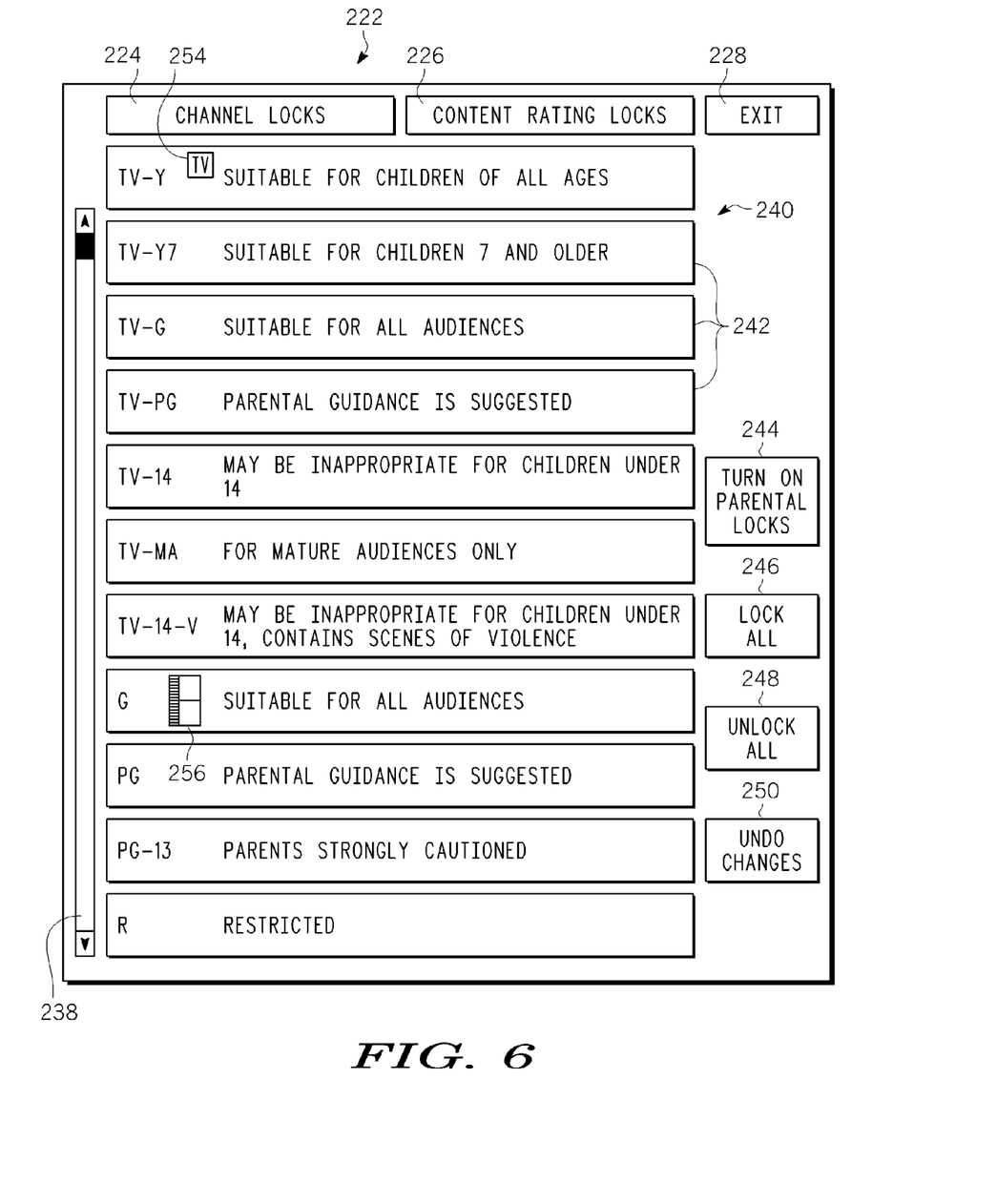
FIG. 6 shows a content rating interface screen that may be selected by the user.

If the user selects content rating lock button 226 in FIG. 5, the content rating interface screen 222 shown in FIG. 6 may be presented. The interface screen 222 presents a field 240 of rating cells 242. Each rating contains a TV or movie rating and a brief description of the rating. In the content rating interface screen 222, a user may select particular ratings to lock and unlock. In one embodiment, clicking on a particular rating cell toggles that rating between a locked and unlocked state. The indicia within the cells of locked ratings generally will be distinguishable from unlocked ratings. Since the number of ratings available may be greater than the number of rating cells 242 that may be displayed clearly within the interface screen 222, a scroll bar 238 may be provided to allow a user to bring additional rating cells into interface screen 222. Content ratings interface screen 222 also include buttons 244, 246, 248 and 250 that operate in a similar manner to that described above in connection with FIG. 5.

When content is blocked either by channel or by content rating, the restriction may be applied completely or only for certain times of the day or week. Stated differently, content that is allowed to be viewed may be limited to a selected total aggregate viewing time (e.g., 2 hours a day) or it may be limited to certain times of the day or week (e.g., the Disney Channel can be viewed only on Saturdays between 4 and 7 pm).

In the examples described above either channel cells (FIG. 5) or content rating cells (FIG. 6) may be selected directly from the interface by a user. In other examples, however, a more interactive interface and method for obtaining input from a user may be employed. For instance, some users may prefer an interface which is even simpler and more automated. In this case a human oriented set of questions may be provided that asks about the individuals who will use the system and their ages. Questions may also be asked about the level of locking desired in general terms. In some cases the questions can be posed in an interactive or wizard format wherein a series of questions are asked and wherein the answers to the questions dictate the subsequent questions. For example, such a questionnaire or wizard interface might begin by asking if any of the users of the SDV system are children. If all of the users are adults, the program might then simply recommend that all programming remain unlocked. On the other hand, if the user indicates that a child or children will be viewing programming, the wizard may then query as to the children's ages. After the children's ages are entered by the user, the wizard may then recommend locking all programming which correspond to the age of the youngest child. For, example, if a user indicates that there are children under the age of 13, the user interface could then suggest that all programs rated for audiences 13 and older be locked. The lock would then be applied on all MPAA levels PG-13 and higher and lock all programs with a rating of TV-14 and higher. Instead of a questionnaire, the subscriber may be presented with a series pre-defined filters from which to select. For instance, some filters may be age-appropriate filters that only allow content suitable for selected age levels, while other filters may branded so that their name indicates something about the content that the filter will allow. For instance, a branded filter may be entitled "Clifford's Choices," or "Oprah's Recommendations."

Some users may prefer to establish parental control rules in an even simpler and more interactive manner than can be accomplished using the preceding interactive wizard interface. For these users the service provider may provide telephone support in which an operator obtains the input from the user and enters it on his or her behalf. In this way the user never even needs to directly input any information through a set top terminal, PC or other client device.

Figure 7:
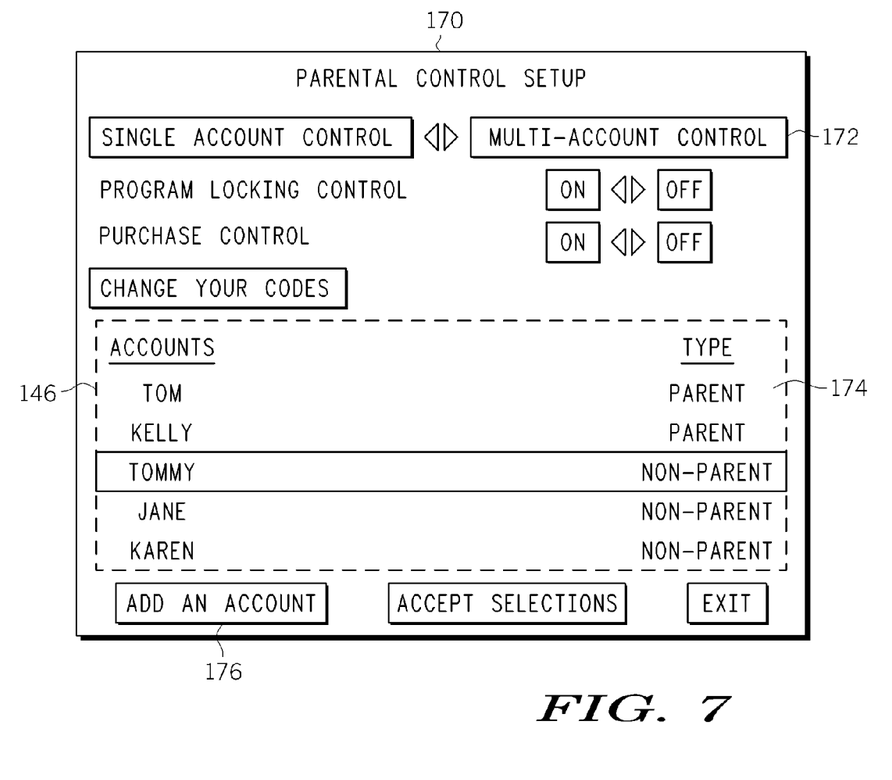
FIG. 7 shows another example of a parental control interface screen that may be presented to the user after selecting the parental control setup option in FIG. 3.
Figure 8:
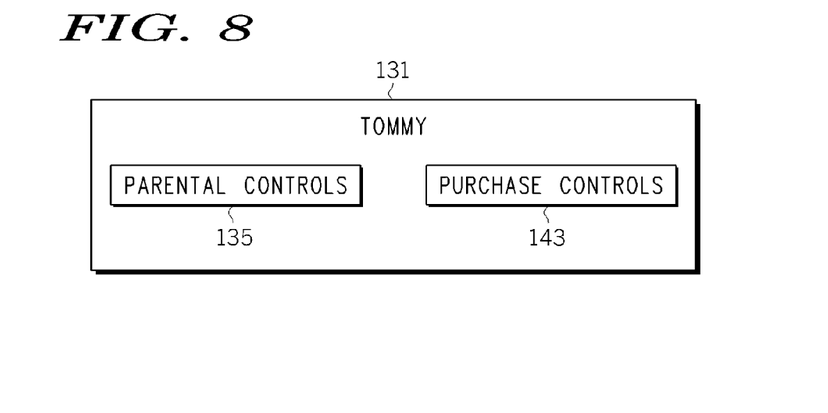
FIG. 8 shows a parental control interface screen that may be presented to the user after selecting the account for "Tommy," in the screen shown in FIG. 8.
Figure 9:
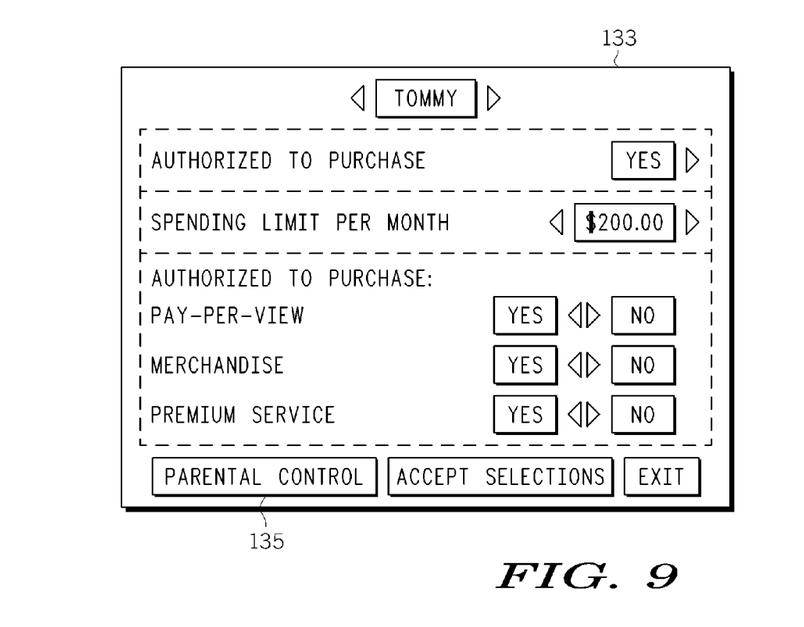
FIG. 9 shows a purchase control criteria display screen that may be presented to the user after selecting the purchase control option from the screen shown in FIG. 8.

In addition to locking selected channels or programming, the predefined rules supplied by the user which are to be invoked by the SDV manager may impose a variety of other controls. For instance, FIG. 7 shows another example of a parental control interface that may be presented to the user after selecting the parental control setup menu 104 in FIG. 3. In this example the user is provided with an opportunity to setup multiple accounts, one for each individual in the household. In particular, interface screen 170 includes multiple account control option 172, add an account option 176 for adding new accounts and account listings region 174 for displaying information related to existing accounts. Account listings region 174 may include individual user-selectable accounts that may be identified by names and/or account types and the like. If, for instance, the user selects the account "Tommy," the screen 131 shown in FIG. 8 may be displayed, which includes a parental control option 135 and a purchase control option 143. The parental control option 135 can be used to control channels or content ratings such as described above in connection with FIGS. 5-6. On the other hand, purchase control option 143 may provide the user an opportunity to set purchase control criteria for the selected account by presenting an interface screen such as the purchase control criteria display screen 133 shown in FIG. 9. As shown, examples of purchase control criteria include a total spending limit over a fixed period of time (e.g., day, week or month) and a delineation of the various products that may or may not be purchased such as pay per view programming, merchandise and/or premium services such as access to premium channels.

In operation, the SDV system will implement the rules that have been established by the subscribers each and every time the SDV manager 215 in FIG. 2 receives a channel change request by accessing the user account database located in the server 218. This can be accomplished by comparing the content of the channel change request to the rules located in the subscriber's account in the parental control database associated with server 218. If the channel request matches one of the rules, the request to supply the SDV program will be denied. That is, the SDV manager 215 will not provide the subscriber with the necessary tuning information for the SDV program if such a match is found. Rather a message will direct the subscriber device to tune to an alternative channel, typically a channel that presents a message to the subscriber that the desired channel is being blocked. The message that is presented to the subscriber may indicate that the desired program is being blocked. The message may be a default message supplied by the service provider, or alternatively, the message may be customized by the subscriber. For instance, if a channel is blocked after expiration of a time period in Tommy's account described above in connection with FIG. 9, a message may be presented stating "Sorry Tommy, you've watched TV for two hours now, time to read a book." Of course, a wide variety of other customized messages may be presented depending on the particular rule that is invoked to block the channel or program. The customized messages may be input by the subscriber using, for example, the control interfaces described above. For instance, in FIGS. 5 and 6, each channel or content rating cell may have an option allowing the subscriber to provide a message that is to appear whenever the rule associated with that cell is invoked.

Figure 10:
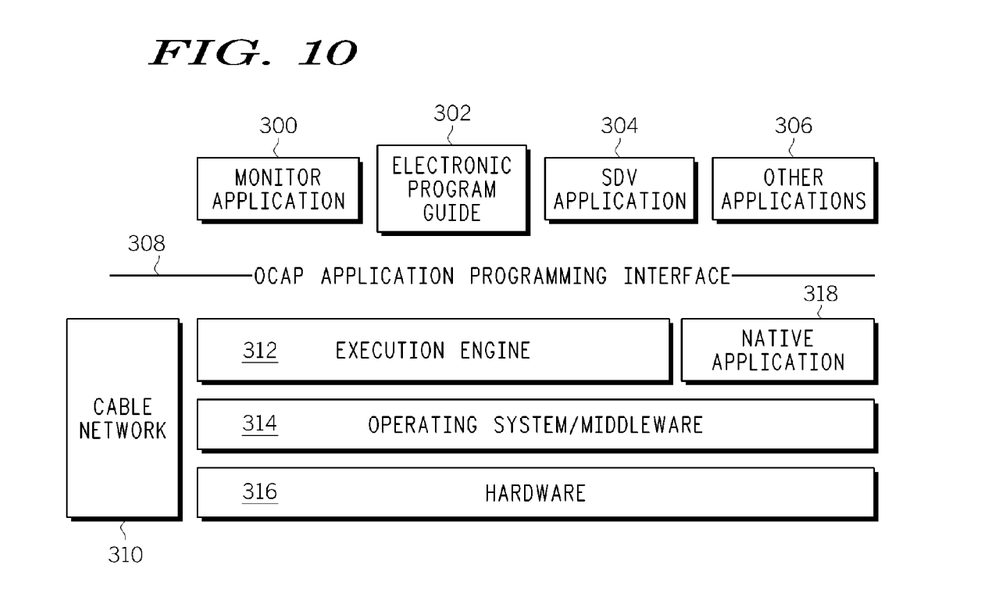
FIG. 10 shows the logical architecture of one particular example of a set top terminal.

FIG. 10 shows the logical architecture of one particular example of a set top terminal such as those depicted in FIG. 1. In this example the set-top terminal is compliant with the OpenCable Application Platform (OCAP) hardware and software environment. The OCAP specification is a middleware software layer specification intended to enable the developers of interactive television services and applications to design such products so that they will run successfully on any cable television system, independent of set-top or television receiver hardware or operating system software choices. As is well known, middleware generally comprises one or more layers of software which are positioned "between" application programs and the lower or physical layers of the network device. Middleware is commonly written for the specific requirements of the operator of the computer system, and the proprietary software purchased by the operator of the computer system. A key role of middleware is to insulate the application programs from the device specific details. By using middleware the application programmers need know very little about the actual network details, since they can rely on the middleware to address the complexities of interfacing with the network. Of course, the set top terminal is not limited to an OCAP-compliant software/hardware architecture. In other cases, for example, the set top terminal may be compliant with MHEG, DASE or Multimedia Home Platform (MHP) middleware. Alternatively, the set top terminal may be based on a proprietary architecture.

Referring to FIG. 10, the top of an OCAP software "stack" includes a Monitor Application 300, Electronic Program Guide (EPG) 302, SDV application 304, and any other applications 306 that may be deployed in a particular network. These applications are run on top of a software layer called the "Execution Engine" 312 and interface to the Execution Engine using the well known OCAP APIs 308. The client device may also include certain software applications or "Native Applications" 318 that do not run within the Execution Engine, but directly run on top of the Operating System/Middleware 314 for the client device. Native Applications are typically written for, e.g., a particular hardware configuration 316 of the set top terminal. Examples of such Native Applications may include management of front panel functionality, remote control interaction, games, and the like. The objects downloaded to the client device in accordance with the techniques described herein may include any of the aforementioned applications and programs as well as additional applications, programs or other objects. However, during an upgrade many of the objects that need to downloaded may be directed to applications located above the OCAP application programming interface 308.

When acquiring viewership information in accordance with the techniques described herein, the SDV application 304 is loaded onto the set top terminals. Once installed, the set top terminals can be readily configured to generate and transmit to the SDV manager the channel change requests, even if all the channels in the system are in a broadcast configuration.

Figure 11:
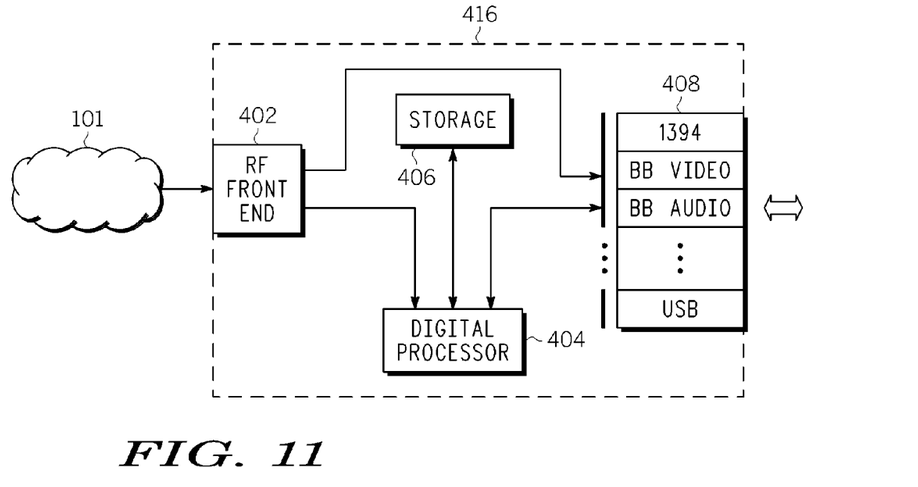
FIG. 11 shows one example of the hardware employed in the set top terminal of FIG. 10.

FIG. 11 shows one example of the set top terminal hardware 416. The device hardware 416 generally includes an RF front end 402 (including a modulator/demodulator and a tuner or tuners) for interfacing with the distribution network (e.g., HFC network 140) of FIG. 1, digital processor(s) 404, storage device 406, and a plurality of interfaces 408 (e.g., video/audio interfaces, IEEE-1394 "Firewire", USB, serial/parallel ports, etc.) for establishing communication with other end-user devices such as televisions, personal electronics, computers, WiFi or other network hubs/routers, etc. Other components which may be utilized within the device include one or more decoder stages, various processing layers (e.g., DOCSIS MAC, OOB channels, MPEG, etc.) as well as media processors and other specialized SoC or ASIC devices. These additional components and functionality are well known to those of ordinary skill in the art and accordingly are not described further herein.

As noted, the SDV application 304 is responsible for communicating the channel change information (e.g., SDV CCMs) between the set top terminal and the SDV manager. The SDV application 304 also receives from the SDV manager the control messages that request the set top terminal to tune to a particular channel or program corresponding to the tuning information provided in the control message.

Figure 12:
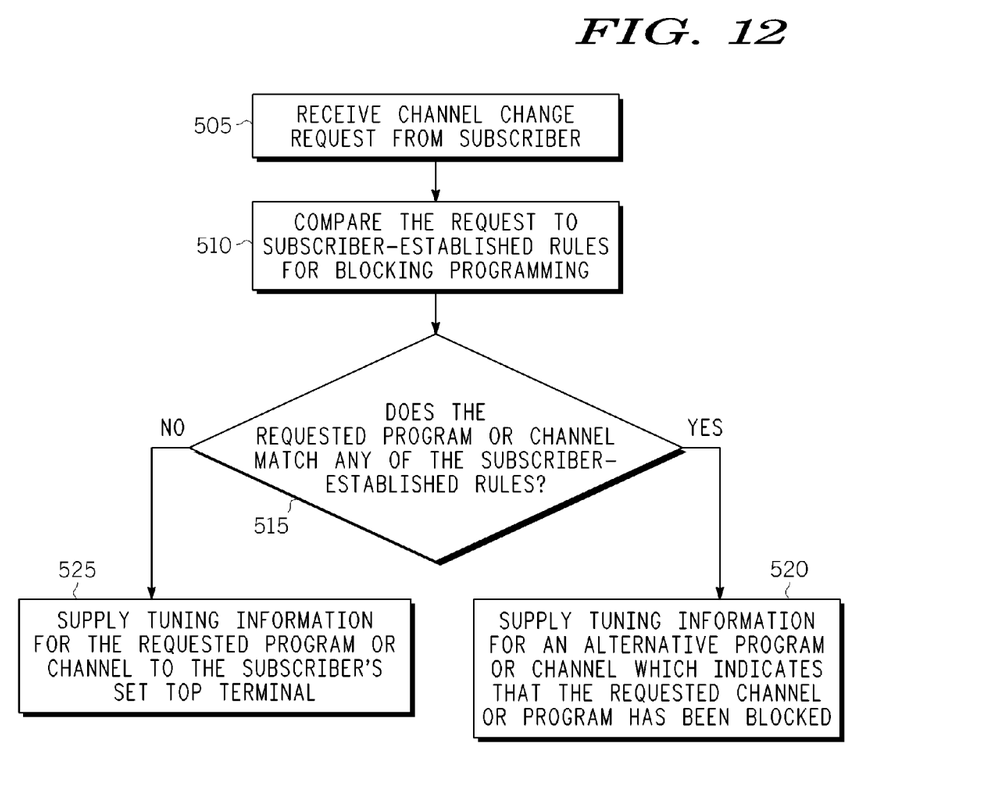
FIG. 12 is a flowchart showing one example of a method by which an SDV system ensures that only programming conforming to subscriber-established rules is provided to the subscriber.

FIG. 12 is a flowchart showing one example of a method by which an SDV system ensures that only programming conforming to subscriber-established rules is provided to the subscriber. The method begins in step 505 when the SDV manager or other suitable entity in the SDV system receives a channel change request for a particular channel or program from the subscriber. Next, in step 510, the SDV system compares the request to any rules that have been established by the subscriber for blocking a program or channel. At decision step 515, the SDV manager determines if the requested program or channel matches any of the subscriber-established rules. If so, then at step 520 the SDV system supplies tuning information for an alternative program or channel which indicates that the requested channel or program has been blocked. If not, then at step 525 the SDV system supplies the tuning information for the requested program or channel to the subscriber's set top terminal so that the subscriber may view the requested program or channel.

The processes described above, including but not limited to those presented in connection with FIG. 12, may be implemented in general, multi-purpose or single purpose processors. Such a processor will execute instructions, either at the assembly, compiled or machine-level, to perform that process. Those instructions can be written by one of ordinary skill in the art following the description of presented above and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized wireline or wireless transmission signals.

A method and apparatus has been described for allowing SDV system subscribers to conveniently establish limitations or controls on programming that may be viewed in a residential or other environment. The limitations or controls are implemented by the SDV manager or other appropriate entity by forcing the set top terminal or other subscriber end device to tune to an alternative program or channel instead of a program or channel that is to be blocked in accordance with pre-defined rules.

The invention claimed is:

1. A content delivery system headend, comprising:
a Switched Digital Video (SDV) manager for coordinating SDV sessions requested by subscribers over an access network by determining SDV transport streams transmitted at a time and directing set top terminals associated with subscribers to a SDV transport stream,
wherein the SDV manager provides channel change requests received from a set to terminal associated with a subscriber to a subscriber controller to determine whether to switch a broadcast channel onto the network for the subscriber and the SDV manager keeps track of which of the subscribers are watching which channel,
an input for receiving content to be broadcast during the SDV sessions; and
the subscriber controller for comparing the channel change requests received by the SDV manager to subscriber-established rules such that the broadcast channel associated with the channel change request is only switched on for the subscriber if the channel change request conforms to the subscriber-established rules;

wherein the if the channel change request is associated with a channel that is to be blocked in accordance with the subscriber-established rules, the SDV manager transmits a control message to the set to terminal from which the channel change request is received, the control message requesting the set to terminal to tune to an alternative channel or program, wherein the alternative program indicates that the program requested by the first subscriber has been blocked, wherein the subscriber-established rules includes channel ratings, content ratings, and purchase control criteria that includes a total spending limit over a period of time, and wherein the headend communicates with the set top terminals via an out-of-band (OOB) channel, a DOCSIS channel, an Internet Protocol (IP) tunnel, an IP connection and associated protocols, and an in-band channel, wherein the control message is transmitted from the SDV manager to the set top terminal via at least one of the out-of-band (OOB) channel, the DOCSIS channel, the Internet Protocol (IP) tunnel, the IP connection and associated protocols, or the in-band channel.

2. The content delivery system headend of claim 1 wherein the programming includes non-SDV programming.

3. At least one non-transitory computer-readable medium encoded with instructions which, when executed by a processor, performs a method including:

receiving, at a switched digital video (SDV) manager, over an access network a channel change request from a first set top terminal used by a first subscriber to supply a program available from an SDV system, wherein the SDV manager is within a headend and the SDV manager determines SDV transport streams transmitted at a time and directing set to terminals associated with subscribers to a SDV transport stream and the SDV manager keeps track of which of the subscribers are watching which channel;

receiving content to be broadcast during a SDV session;

comparing, using the SDV manager, the channel change request to subscriber-established rules in a subscriber database that includes an entry for the first subscriber, the subscriber database included in the SDV manager, wherein the subscriber-established rules includes channel ratings, content ratings, and purchase control criteria that includes a total spending limit over a period of time;

denying the channel change request to supply tuning information from the SDV manager for accessing the program from the SDV manager to the first set top terminal if the entry for the first subscriber includes at least one subscriber-established rule for blocking the program that matches the channel change request, wherein denying the request includes transmitting a control message to the first subscriber requesting the first subscriber to tune to an alternative program instead of the program requested by the first subscriber wherein the alternative program indicates that the program requested by the first subscriber has been blocked, wherein the headend communicates with the set top terminals via an out-of-band (OOB) channel, a DOCSIS channel, an Internet Protocol (IP) tunnel, an IP connection and associated protocols, and an in-band channel, wherein the control message is transmitted from the SDV manager to the set top terminal via at least one of the out-of-band (OOB) channel, the DOCSIS channel, the Internet Protocol (IP) tunnel, the IP connection and associated protocols, or the in-band channel.

4. The non-transitory computer-readable medium of claim 3 wherein the message is a subscriber-customized message.

5. The non-transitory computer-readable medium of claim 3 wherein the program is an SDV program.

6. The non-transitory computer-readable medium of claim 3 wherein the program is a non-SDV program.

7. The non-transitory computer-readable medium of claim 3 wherein the channel change request is transmitted in a Channel Change Message that conforms to a switched digital video Channel Change Message protocol.

8. The non-transitory computer-readable medium of claim 3 further comprising: receiving a request for a viewing history of programming viewed over a prescribed period of time; and presenting the viewing history to the first subscriber over the access network.

9. A method for providing programming over a content delivery system, comprising:

receiving, at a switched digital video (SDV) manager, over an access network a channel change request from a set top terminal associated with a subscriber to supply a program available from an SDV system, wherein the SDV manager is within a headend and the SDV manager determines SDV transport streams transmitted at a time and directing set top terminals associated with subscribers to a SDV transport stream and the SDV manager keeps track of which subscribers are watching which channel;

receiving content to be broadcast during a SDV session;

comparing, using the SDV manager, the channel change request to subscriber-established rules in a subscriber database that includes an entry for the subscriber, the subscriber database included in the SDV manager, wherein the subscriber-established rules includes channel ratings, content ratings, and purchase control criteria that includes a total spending limit over a period of time;

supplying tuning information for accessing the program from the SDV manager to the set top terminal only if the channel change request does not conform to at least one subscriber-established rule for blocking the program included in the subscriber database and transmitting a control message to the set to terminal subscriber requesting the subscriber to tune to an alternative program instead of the program requested by the subscriber, wherein the alternative program indicates that the program requested by the first subscriber has been blocked, wherein the headend communicates with the set top terminals via an out-of-band (OOB) channel, a DOCSIS channel, an Internet Protocol (IP) tunnel, an IP connection and associated protocols, and an in-band channel, wherein the control message is transmitted from the SDV manager to the set top terminal via at least one of the out-of-band (OOB) channel, the DOCSIS channel, the Internet Protocol (IP) tunnel, the IP connection and associated protocols, or the in-band channel.

10. The method of claim 9 wherein the program is a non-SDV program.

11. A method for accessing programming over switched digital video (SDV) system, comprising:

providing to an SDV system subscriber-established rules for blocking programming available from the SDV system, the subscriber-established rules stored in a SDV manager, wherein the SDV manager is within a headend and the SDV manager determines SDV transport streams transmitted at a time and directing set to terminals associated with subscribers to a SDV transport stream and the SDV manager keeps track of which subscribers are watching which channel, wherein the subscriber-established rules includes channel ratings, content ratings, and purchase control criteria that includes a total spending limit over a period of time;

in response to user input, sending a channel change request requesting the SDV system to supply a selected program or channel to the SDV manager;

receiving a control message in response to the channel change request from the SDV manager, said control message including tuning information from the SDV for tuning to a program or channel different from the selected program or channel if the selected channel or program does not conform to at least one of the subscriber-established rules, wherein the program or the channel different from the selected program presents a message indicating that the channel change requested has been blocked; and receiving content to be broadcast during a SDV session;

tuning to the different program or channel as directed by the control message, wherein the headend communicates with the set top terminals via an out-of-band (OOB) channel, a DOCSIS channel, an Internet Protocol (IP) tunnel, an IP connection and associated protocols, and an in-band channel, wherein the control message is transmitted from the SDV manager to the set top terminal via at least one of the out-of-band (OOB) channel, the DOCSIS channel, the Internet Protocol (IP) tunnel, the IP connection and associated protocols, or the in-band channel.

12. The method of claim 11 wherein the subscriber established rules are provided over an Internet connection using a web-based interface.

13. The method of claim 11 wherein providing the subscriber established rules includes providing rules for at least two viewer accounts in which at least one rule is provided for a first viewer and a different second rule is provided for a second viewer.

14. The method of claim 11 wherein providing the subscriber established rules includes further providing a user-specified message to be presented on the different program or channel when the selected program or channel does not conform to the rule.

* * * * *